Nov. 5, 1957  R. C. KRUEGER  2,812,038
GAS FILTER
Filed May 5, 1953
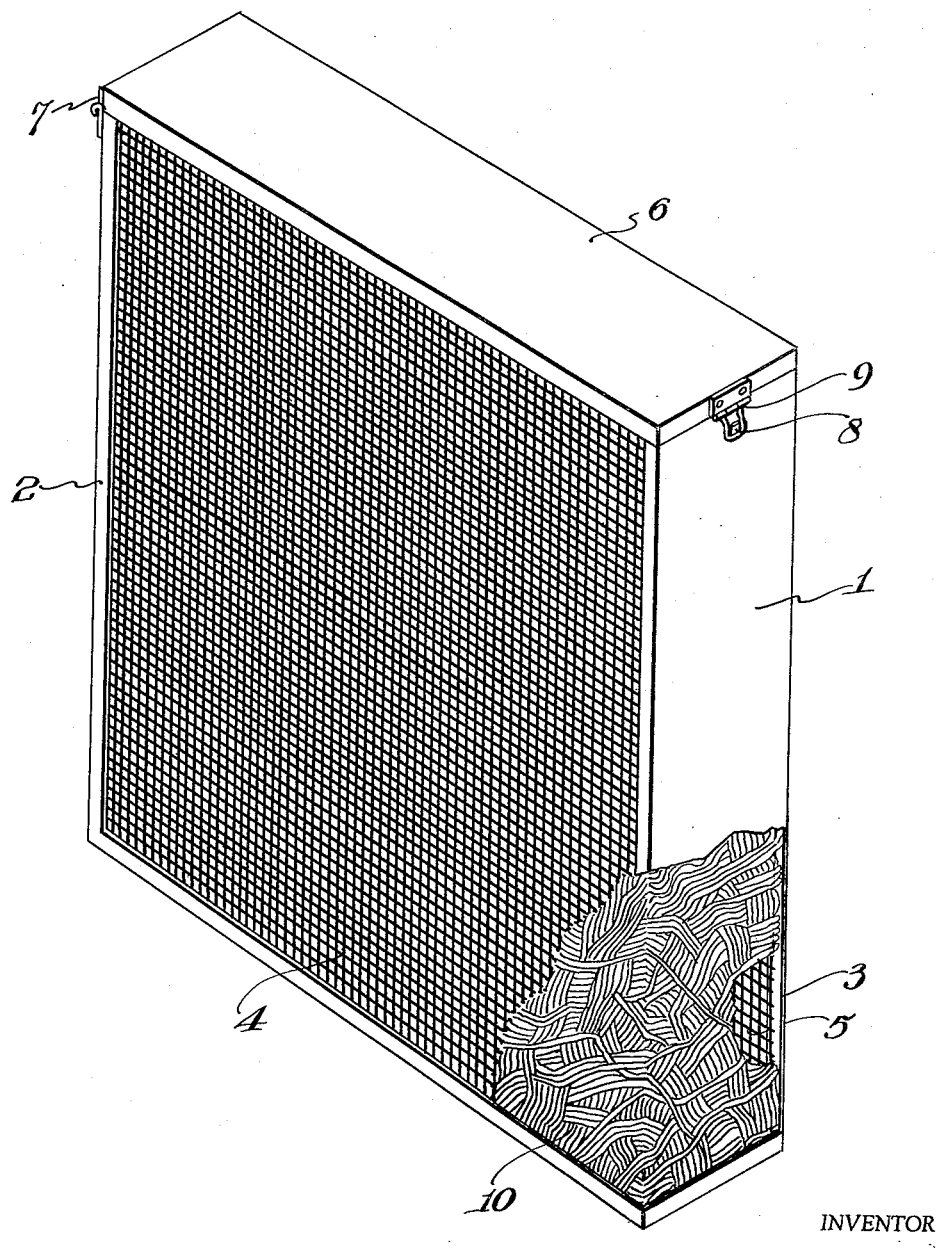
INVENTOR
Ralph C. Krueger
BY
ATTORNEY

United States Patent Office 2,812,038
Patented Nov. 5, 1957

2,812,038
GAS FILTER

Ralph C. Krueger, Wilmington, Del., assignor to E. I. du Pont de Nemours and Company, Wilmington, Del., a corporation of Delaware Application May 5, 1953, Serial No. 353,105

3 Claims. (Cl. 183—122)

This invention relates to improved filters and, more particularly, to improvements in filters for the removal of solid particles from gaseous media.

The widespread adoption and rapid development of air-conditioning systems has given rise to an ever-increasing demand for air filters, simple in design, low in initial cost and in upkeep, and efficient in operation. Probably the most generally acceptable type of filter for the purpose, heretofore employed, is the impingement type of filter wherein the filtering medium comprises a loose mat of fiber glass, mineral wool, or like supporting material, presenting a large surface area, which area is coated with an adhesive substance such as glycol, tricresyl phosphate, petroleum, etc. Solid particles contained in the air or other gaseous media passing through the filter impinge on and are, for the most part, retained by the adhesive coating until the coating becomes substantially covered, i. e., saturated with the solid particles, at which point the filter must be taken out of service or suitably reconditioned as by washing. The chief disadvantage of this type of filter is that in order to recondition it for further use, it is necessary that the adhesive coating be removed by the washing operation, after which the supporting material must be recoated. Moreover, the adhesive coating often imparts an objectionable odor to the filtered air, and occasionally the filtered air is contaminated with bits of the supporting material. A further disadvantage is that the impingement type filter does not effectively remove extremely fine particles of contaminant.

An object of this invention, therefore, is to provide a filtering medium for gases which fulfills the requisites of high filtering efficiency and low initial cost and upkeep, and which is free of the disadvantages above stated. Another object is to provide an improved air filtering medium which is physically and chemically stable at relatively high temperatures existing in hot air heating systems; which effectively removes fine as well as large particles of foreign matter; and which can be repeatedly reconditioned simply by washing therefrom the adherent particles filtered from the air or other gaseous media. These and other objects will more clearly appear hereinafter.

The above objects are realized by the present invention which, briefly stated, comprises a filter wherein the filtering medium consists of highly polymeric linear terephthalic ester such as polyethylene terephthalate in the form of fibers, shredded film, or particles, suitably matted.

Filament- and film-forming, highly polymeric terephthalic esters suitable for purposes of this invention are fully described in Whinfield and Dickson U. S. P. 2,465,319. From the commercial standpoint, the most attractive polyester is polyethylene terephthalate; and the invention will be hereinafter described with specific reference to this preferred member of the class. For use in high temperature systems, such as hot air heating systems, exhaust filter systems, etc., it is also preferred that the polyethylene terephthalate structure be oriented and heat-set, e. g., film stretched three times (3X) biaxially and heat-set at 200° C., which treatments serve to enhance its tensile strength and rigidity and to impart improved dimensional stability under raised temperature conditions.

The polymeric terephthalic esters may be used in the form of filaments, either continuous or staple, or the filter medium may be comprised of shredded film. Filaments having a denier greater than about 0.5 denier/filament are normally used in commercial, i. e., in homes, stores, office buildings, etc., air conditioning systems because mats of such filaments of 0.5 denier/filament and greater do not offer excessive resistance to the passage of air. Furthermore, these filters are not normally installed for the purpose of removing so-called microparticles, but are designed to remove larger dust particles from the conditioned air. For removal of the microparticles from gases, microfibers may be employed, these fibers having a denier of less than 0.5 denier/filament and normally less than 0.2 denier/filament. In general, shredded film is more rigid than are filaments and, hence, is less subject to dislocation, which could result in the formation of channels and uneven distribution of the filter medium. Polyester in particulate form may likewise be employed with good result; or, if desired, the filtering medium may be made up of a mixture of forms, e. g., a matting of shredded polyester film, to lend rigidity, intermixed with polyester fibers. In certain application, it may also be of advantage to employ polyester filaments or film in conjunction with conventional adhesive-coated material.

The dimensions of the polyester structure are not critical and will depend, for the most part, on the required surface area of filtering medium relative to the permissible volume of the filter in any given instance, and on the physical stability, i. e., strength and stiffness, desired.

The accompanying drawing showing a perspective view of a conventional air filter frame with parts broken away to expose the novel filtering medium is illustrative of a typical embodiment of this invention.

Referring to the drawings, three sides of the frame are comprised of a channel-shaped member 1, having flanges 2 and 3 constructed to retain and support screen members 4 and 5 respectively, which serve to cover the front and back openings of the frame. The fourth side of the frame consists of a cover 6 which is also channel-shaped and which is movably attached to 1 by any suitable means such as a hinge 7, catch 8 and latch 9. The filter frame construction described is conventional and permits ready removal and replacement of the filtering meduim 10, which, in the present invention, is made up from polyester fibers, shredded film or particles as hereinabove set forth.

The effectiveness of the filtering media of this invention is demonstrated by the following accelerated test:

The apparatus used consisted of a plastic tube or air tunnel about 3½ feet long and 6 inches in diameter, connected at one end to the intake of a vacuum pump. A weighted amount of the filter material was carefully and evenly packed between two ¼ inch wire mesh retaining screens located one inch apart and about midway of the length of the tube. The filter media consisted of (1) shredded 2 mil polyethylene terephthalate film of approximately 2 mm. width and (2) unsized polyethylene terephthalate fibers. The vacuum pump was controlled with a powerstat so that a stream of air at a velocity of 300 F. P. M. (at the face of the tunnel) was drawn through the tunnel. Smoke, which was generated at the mouth of the tunnel by burning a mixture of ethanol and benzene (50:50), was introduced into the air stream. The amount of fuel which was burned during a specified time was noted, and the test filter was weighed to the nearest mg. before and after the run. The effectiveness of the filter was rated in grams of smoke solids picked up per 20 gms. of fuel burned. In no case could any traces of the black smoke be observed passing from the filters. The results of these accelerated tests are shown in the following table:

Table I

| Filter Medium | Duration (min.) | Gms. Fuel Burned | Gms. Smoke Picked Up | Rating [1] |
|---|---|---|---|---|
| Polyethylene Terephthalate Film | 95 | 21.0 | 0.378 | 0.360 |
| Do | 120 | 28.0 | 0.428 | 0.306 |
| Average | | | | 0.333 |
| Polyethylene Terephthalate Fiber | 85 | 17.2 | 0.533 | 0.620 |

[1] The amount of smoke or degradation products (in grams) picked up for 20 grams of fuel burned.

Shredded polyethylene film tested under the same conditions had an average rating of 0.318.

It is to be understood that the specific embodiments above described are for purposes of illustration and that the present invention resides in the provision of a new filtering medium of broad application independent of any particular type or construction of filter frame or housing therefor.

The shredded film, fibers and like structures of polymeric linear terephthalic ester suitable for purposes of this invention are available, to a considerable extent, from scrap film, fibers, etc., which makes for a filter medium of low initial cost. Additional advantages of the present filtering medium are low upkeep, good mechanical ond chemical stability, long life, freedom from volatile constituents, ease of cleaning, and good filtering efficiency. Oriented, heat-set polyethylene terephthalate film, in particular, has unusual thermal stability which especially fits it for use as a filtering medium in hot air heating systems where many other plastic materials would not be feasible.

I claim:

1. A process for removing suspended solid particles from a gas at high temperature which comprises passing the gas at a high temperature through a gas-permeable mat of randomly distributed free polyethylene terephthalate structures, said structures being oriented and heat-set.

2. A process as in claim 1 wherein said polymeric structures are shredded film.

3. A process as in claim 1 wherein said polymeric structures are filaments having a denier of at least 0.5 denier/filament.

References Cited in the file of this patent

UNITED STATES PATENTS

| | | |
|---|---|---|
| 232,122 | Hammesfahr | Sept. 14, 1880 |
| 2,251,964 | Stackhouse | Aug. 12, 1941 |
| 2,328,302 | Simpson | Aug. 31, 1943 |
| 2,411,660 | Manning | Nov. 26, 1946 |
| 2,556,295 | Pace, Jr. | June 12, 1951 |
| 2,569,575 | Philipps | Oct. 2, 1951 |
| 2,612,966 | Nicol | Oct. 7, 1952 |
| 2,676,128 | Piccard | Apr. 20, 1954 |